United States Patent [19]

Jackson

[11] 4,407,130
[45] Oct. 4, 1983

[54] DRIVE OPERATED BY RECEPTACLES ALTERNATELY WATER FILLED AND RENDERED BUOYANT

[76] Inventor: William R. Jackson, Rocky Dundee Rd., West Buxton, Me. 04093

[21] Appl. No.: 275,322

[22] Filed: Jun. 19, 1981

[51] Int. Cl.³ .............................................. F03B 9/00
[52] U.S. Cl. .......................................... 60/496; 415/7
[58] Field of Search .................. 60/495, 496; 417/337; 415/5, 7; 290/1 R

[56] References Cited

U.S. PATENT DOCUMENTS

| | | | |
|---|---|---|---|
| 271,040 | 1/1883 | Cook | 60/496 |
| 366,551 | 7/1887 | Baker | 60/496 |
| 2,135,110 | 11/1938 | Platt | 60/496 |
| 3,907,454 | 9/1975 | Punton | 60/496 X |
| 3,934,964 | 1/1976 | Diamond | 60/496 X |
| 4,054,031 | 10/1977 | Johnson | 60/496 |
| 4,084,375 | 4/1978 | Horvath | 60/496 |

FOREIGN PATENT DOCUMENTS 215602  5/1924  United Kingdom .................. 60/496

Primary Examiner—Allen M. Ostrager
Assistant Examiner—Stephen F. Husar

[57] ABSTRACT

A drive is disclosed utilizing at least two units of which one may be an auxiliary. Each unit is positionable in a relatively deep body of water and has upper and lower sprockets about which a chain is trained which carries a series of receptacles that open in the trailing direction. The chain courses of the conveyors that are to travel upwardly are close together and air under pressure is delivered into the receptacles of at least one unit as they reach the lower end of its upwardly travelling course to render the receptacles of those courses buoyant. At least one receptacle of each unit is positioned to receive air escaping from or bypassing a receptacle of the other unit. At the upper end of the downwardly travelling courses, the receptacles become weighted as they fill with water.

13 Claims, 11 Drawing Figures

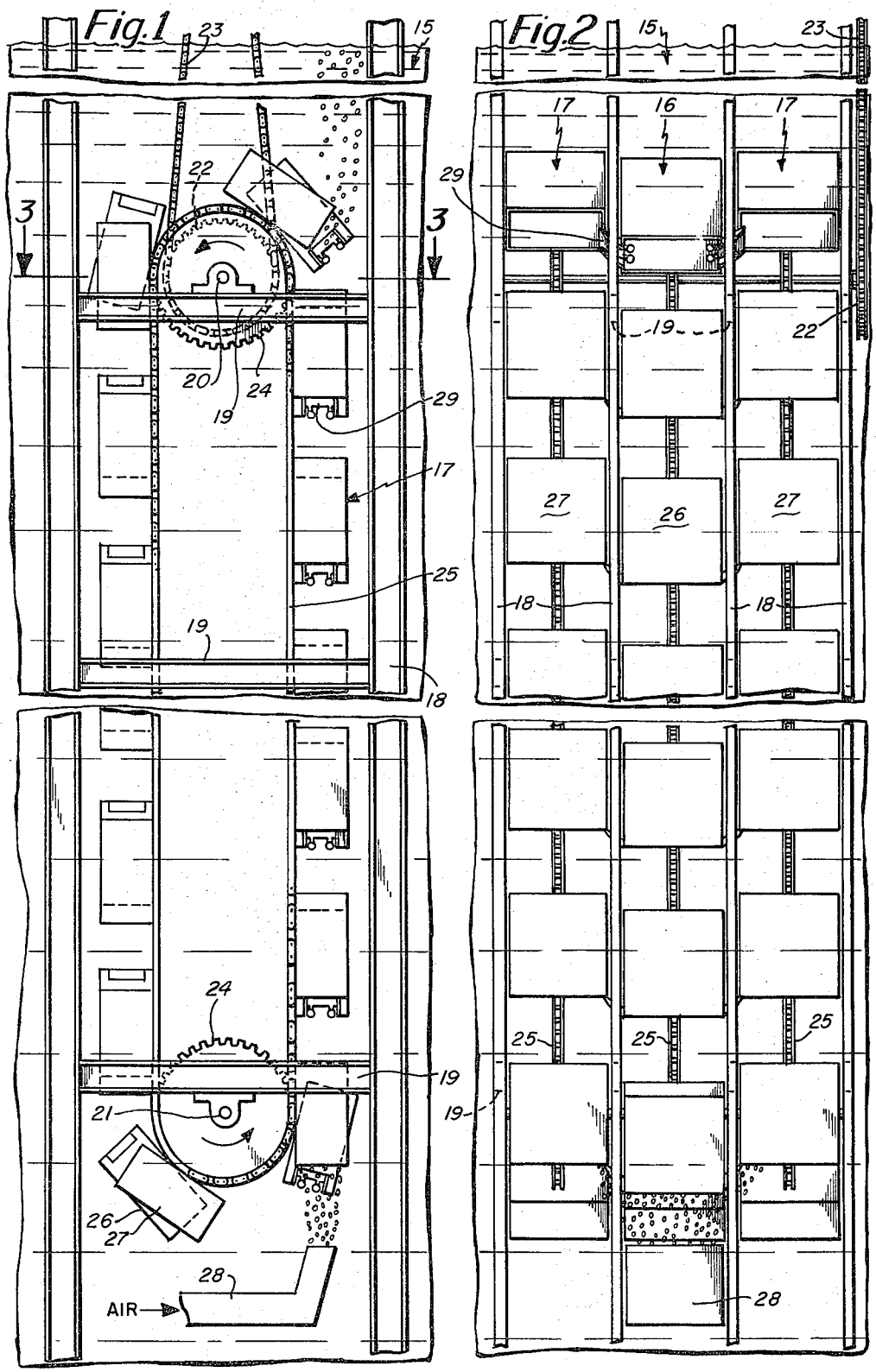

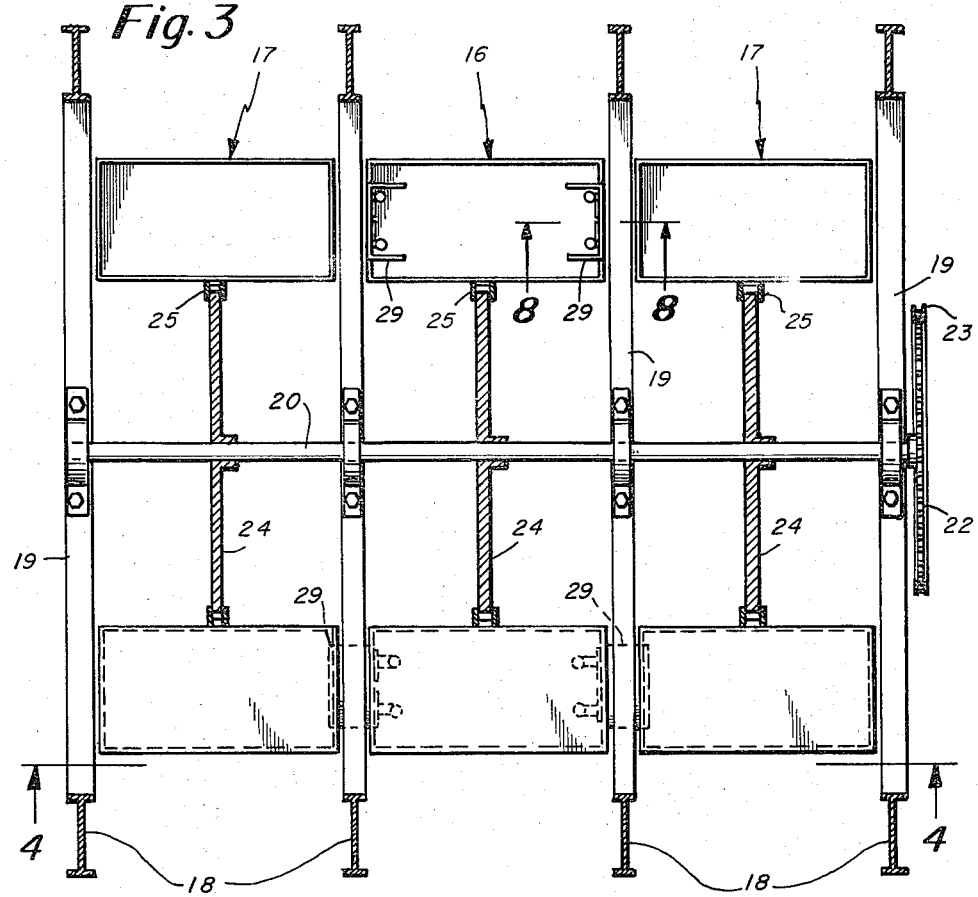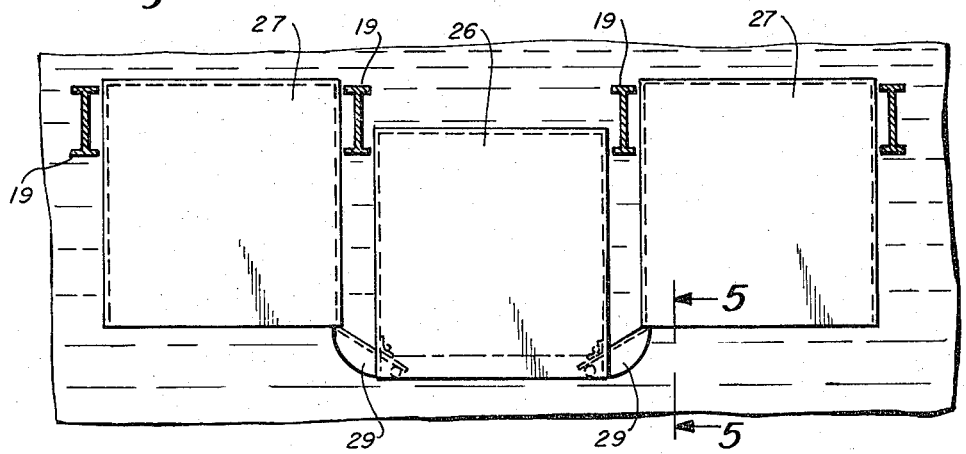

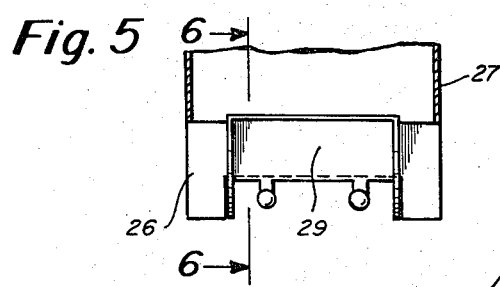
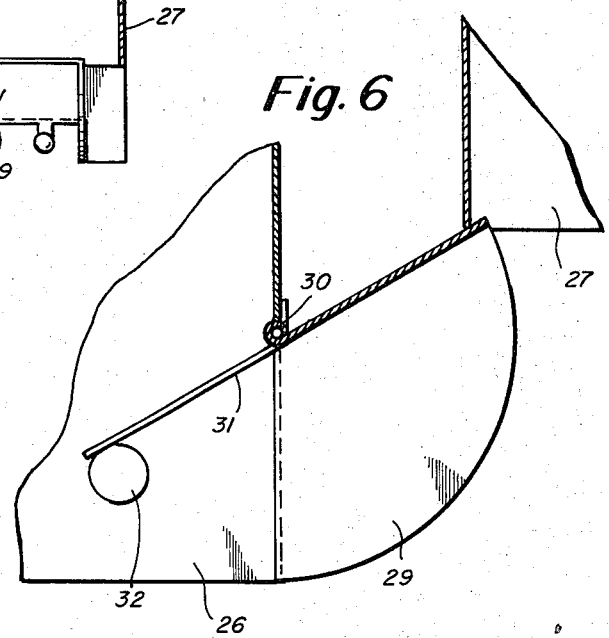
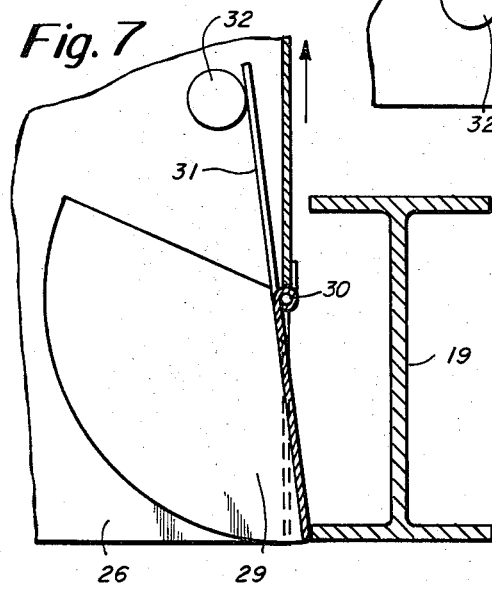
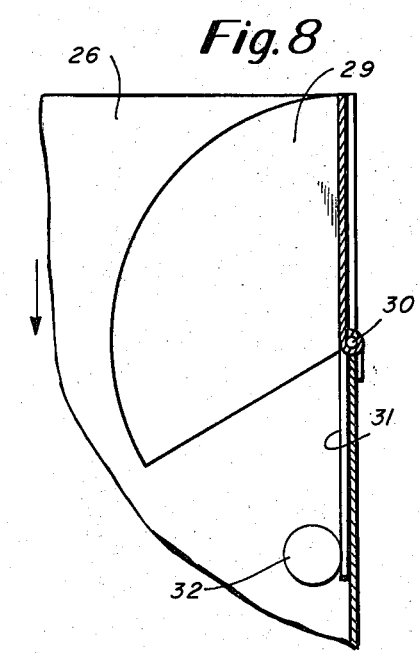

DRIVE OPERATED BY RECEPTACLES ALTERNATELY WATER FILLED AND RENDERED BUOYANT

BACKGROUND REFERENCES

U.S. Pat. No. 2,135,110
U.S. Pat. No. 3,907,454
U.S. Pat. No. 3,934,964
U.S. Pat. No. 4,054,031

BACKGROUND OF THE INVENTION

The patents cited above relate to apparatus of the type having a series of receptacles attached to a chain or chains or other flexible member trained about vertically aligned sprockets or pulleys supported in a body of water with means operable to render the receptacles of the upwardly ascending courses buoyant as compared with those of the descending course which are full of water.

As far as I am aware, there is no information as to the efficiency of any such apparatus. Where the receptacles were to be rendered buoyant by displacing water therefrom by means of air or other buoyant medium, efficiency depends not only on the cost thereof but also the full utilization of the buoyant medium.

THE PRESENT INVENTION

The general objective of the present invention is to provide apparatus of the above type in which the buoyant fluid is utilized in a manner ensuring maximum efficiency.

In accordance with the invention, this objective is attained by providing apparatus having at least two units. Each unit has upper and lower rotatable members about which a flexible member is trained. Each flexible member has a series of open-ended receptacles attached thereto with their open ends, their trailing ends. The units have their courses that are to travel upwardly proximate. A stream of buoyant fluid is delivered under pressure in a manner operable to effect the removal of water from a receptacle of one unit that is to ascend with at least one receptacle of the other unit so positioned that it receives buoyant fluid bypassing or escaping from the first name receptacle as it rises.

The units may be substantially identical with two or more functioning as main units with an appropriate number of auxiliary units or one may be a main unit and the other or others auxiliary units, that is, they are not intended to receive the buoyant fluid directly. Other preferred arrangements have, for examples, one main unit and two or more auxiliary units, two or more main units and one auxiliary unit, and two or more main units and two or more auxiliary units. In any case, the number of auxiliary units depends on the depth to which the main units extend as the greater the depth, the more likely is the escape of the expanding fluid from ascending receptacles. The main units are usually, but not necessarily of the same length while the auxiliary units are often but not necessarily shorter.

While the buoyant fluid is preferably air under pressure, other sources could be used in some installations. For example, the air under pressure (buoyant fluid) could be heated before or after entering the receptacles to expand it, thus in its expanded state will occupy more space in receptacles, or the exhaust of a prime mover, which could be employed for other purposes, could be used. The temperature of the water in which the units are located, if elevated, could be used for other purposes.

Another objective of the invention is to facilitate the transfer of buoyant material seeking escape from an ascending receptacle, an objective attained by providing receptacles with an upwardly inclined chute at their open ends. The outer ends of each chute underlie the open ends of another receptacle. Each such chute is pivotally connected to its receptacle and is yieldably biased, preferably counterweighted although springs may be used for that purpose to enable the chute to have an operative position, when ascending, an inoperative position within its receptacle while descending, and the capability of readily becoming inoperatively positioned when engaging the framework which its receptacle might pass.

BRIEF DESCRIPTION OF THE DRAWINGS

The accompanying drawings illustrate preferred embodiments of the invention of which:

FIG. 1 is a somewhat schematic side view of a drive in accordance with one embodiment of the invention having one main and two auxiliary conveyors;

FIG. 2 is a front view thereof;

FIG. 3 is a view of the drive on a substantial increase in scale and taken approximately along the indicated line 3—3 of FIG. 1;

FIG. 4 is a section taken approximately along the indicated line 4—4 of FIG. 3;

FIG. 5 is a fragmentary section taken approximately along the indicated line 5—5 of FIG. 4;

FIG. 6 is a section, on a substantial increase in scale, taken along the indicated line 6—6 of FIG. 5;

FIG. 7 is a like view illustrating the position of the chute of an ascending receptacle passing framework;

FIG. 8 is another like view illustrating the position of the chute of a descending receptacle;

THE PREFERRED EMBODIMENTS OF THE INVENTION

Figure 9:
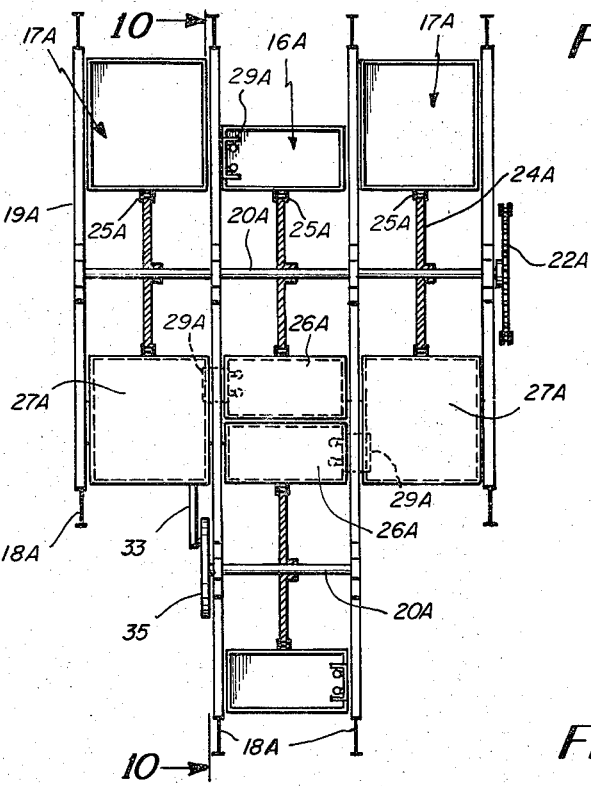
FIG. 9 is a somewhat schematic top plan view of a drive in accordance with another embodiment of the invention having two main and two auxiliary conveyors.

The embodiment of the invention illustrated by FIGS. 1-8 is presented somewhat schematically. A body of water is generally indicated at 15 and it may be a river, lake, the ocean or a tank and is indicated as being of substantial depth.

A main unit is generally indicated at 16 and is flanked by auxiliary units, generally indicated at 17 with the three units incorporated in supporting structure which may be positioned on the bottom of the body of water or it may be suspended therein. The supporting structure is shown as consisting of four, spaced apart pans of vertical members with each pair 18 connected at least adjacent their upper or upright ends by transverse members 19 which support upper and lower shafts 20 and 21, respectively.

The shaft 20 is common to the units 16 and 17 and is shown as having a sprocket 22, see FIG. 3, at one end about which is trained a chain 23 extending upwardly from the body of water 15 as part of the equipment, typically but not necessarily a generator, not shown, that is to be powered by the drive. In the disclosed embodiment, the shaft 21 is shown as common to the three units as the auxiliary units 17 are of the same length as the main unit 16.

Each unit is located between suitable supporting structure schematically represented by two pairs of uprights 18 and consists of sprockets 24 fixed on the shafts 20 and 21 with a chain 25 trained about them. Each unit also has a series of open ends receptacles pivotally connected to its chain. The receptacles of the unit 16 are generally indicated at 26 while those of the auxiliary units are generally indicated at 27 and they are spaced and arranged so that each receptacle 26 is between and slightly below a receptacle 27 of each auxiliary unit 15. The chains 25, when the units are in operation travel in a counter-clockwise direction as viewed in FIG. 1 and all the receptacles are disposed with their open ends, their trailing ends.

Means, represented by the nozzle 28 are provided to deliver a buoyant fluid under pressure, typically but not necessarily air under pressure, against the open end of a receptacle 26 as it starts its upward travel thus to expel water therefrom and render that receptacle buoyant. Once the drive is started, water filled receptacles exert a downward force on downwardly extending chain courses while the buoyant receptacles exert an upward force on the upwardly extending courses.

A considerable portion of the stream of buoyant fluid is diverted and it is for the utilization of such that the auxiliary units 17 are provided. It will also be appreciated that the depth to which the units extend is also a reason for employing auxiliary units since as the buoyant receptacles rise, the buoyant fluid expands as the water pressure decreases with escaping buoyant fluid desirably caught by the receptacles of adjacent auxiliary units.

For that reason, the receptacles against which the buoyant fluid is directed and those from which expanding fluid is directed and those from which expanding fluid may escape, in the disclosed embodiment, the receptacles 26, are provided with laterally extending and upwardly inclined chutes 29, see FIGS. 5-8, in each of their side walls to extend upwardly into the open ends of the proximate receptacles 27 of the auxiliary units 17. Each chute 29 is by a hinge 30 connected to walls of its receptacle 26 with a section 31 within that receptacle and counterweighted as at 32. While receptacles 26 are ascending, the chutes 29 have their operative position illustrated by FIG. 6. and while descending, the chutes become inoperatively positioned as illustrated by FIG. 8. In addition, the chutes 29 become inoperatively positioned when in engagement with transverse framework members 19.

Figure 10:
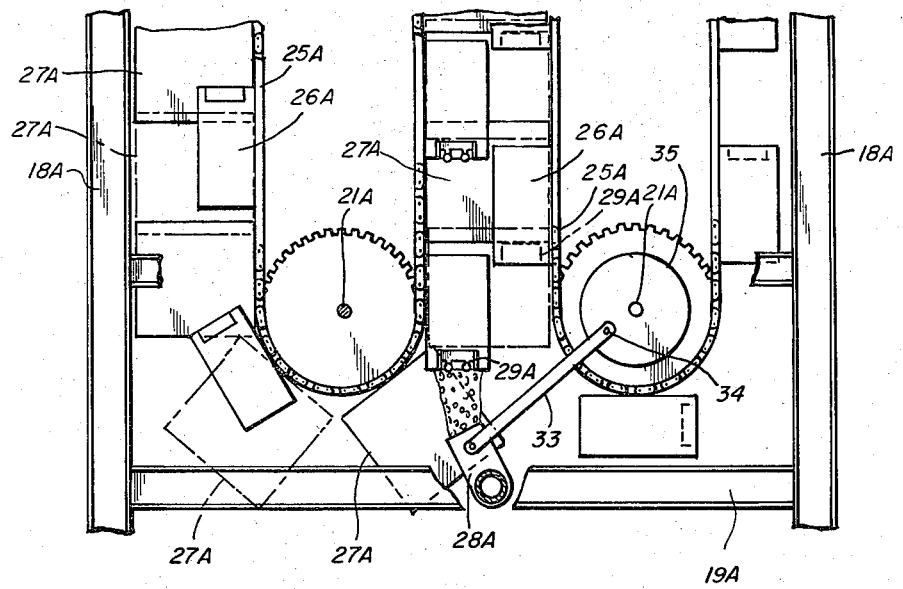
FIG. 10 is a fragmentary section taken approximately along the indicated line 10—10 of FIG. 9.

The embodiment of the invention illustrated by FIGS. 9 and 10 is one utilizing two main conveyors and two auxiliary conveyors and corresponding units and corresponding parts are not again detailed but are identified by the appropriate reference numerals distinguished by the suffix addition A.

The two intermediate pairs of transverse members 19A of the supporting structure are of sufficient length to enable two main units, the unit 16A and the unit 116, to be incorporated therein. The construction of these units is or may be identical to that of the unit 16.

The supporting structure also is provided with two ascending units 17B and these are or may be identical to the unit 17 except that, as is apparent from FIG. 9, the sides of the receptacles 27A facing the ascending receptacles 26A are of sufficient width to enable each to receive escaping buoyant fluid from the receptacles of the main units.

The nozzle 28A in this embodiment of the invention is pivoted and is connected by a link 33 to an eccentric pin 34 on a disc 35 fixed on the proximate end of the shaft 21A thus to swing the nozzle 28A under the lowermost receptacle 26A of the first one main unit and then the other.

Figure 11:
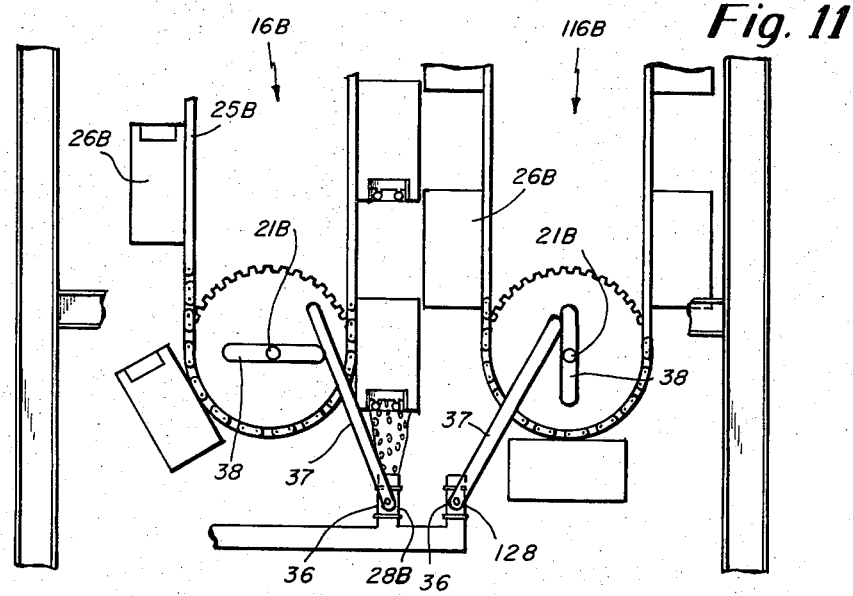
FIG. 11 is a like view of another embodiment of the invention.

The embodiment of the invention illustrated by FIG. 11 is also generally similar to the previously described drives and, accordingly, corresponding parts and units are indicated by the same reference numerals distinguished, however, by the suffix addition B.

In this embodiment of the invention, the supply line for the buoyant fluid is shown as containing two nozzles, the nozzle 28B in a position to direct the fluid under pressure against the open end of ascending receptacles 26B of the main unit 16B and the nozzle 128 positioned to discharge the fluid under pressure against the ascending receptacles 26B of a second main unit 116B. Each nozzle includes a normally closed valve 36 provided with a control arm 37 in engagement with a cam 38 fixed on an end 21B of the appropriate main unit.

I claim:

1. Apparatus for use in a relatively deep body of water or other fluid to provide a drive, said apparatus including at least two units, the lower end of one close to the lower end of the other, each unit including supporting structure within said body, upper and lower sprockets rotatably connected to said structure, chains trained about said sprockets, and a series of open ended receptacles attached to said chains and uniformly spaced from each other with all receptacles opening in the trailing direction, said units closely spaced with the chain courses that are to travel upwardly proximate, means to deliver a stream of buoyant fluid under pressure into an ascending receptacle of one of the units thereby to render that receptacle buoyant, said one unit the main and the other unit an auxiliary unit, said receptacles so positioned that the ascending ones of the auxiliary unit may receive buoyant fluid bypassing lower ascending receptacles of the main unit or escaping from the proximate sides thereof.

2. The apparatus of claim 1 in which there are a plurality of main units.

3. The apparatus of claim 2 in which there are a plurality of auxiliary units, one on each side of the vertical zone common to the ascending courses of the main units.

4. The apparatus of claim 3 in which there are two ascending units, one on each side of said zone.

5. The apparatus of claim 1 in which the receptacles of one unit are so spaced and arranged relative to the receptacles of another unit that the open end thereof in the ascending course are slightly above the appropriate one of the receptacles of another unit and each receptacle of said other unit includes a chute at the open end thereof disposed to extend upwardly under the open end of the appropriate one of the receptacles of said one unit.

6. The apparatus of claim 5 in which each chute is pivotally connected to a receptacle and includes means yieldably holding said chute outwardly and upwardly.

7. The apparatus of claim 6 in which the means holding the chute are counterweights.

8. The apparatus of claim 7 in which during its descent of its receptacle, the counterweights swing the chutes upwardly within their receptacles.

9. The apparatus of claim 8 and means to so operate the means by which the buoyant fluid is delivered that said fluid is first discharged under an ascending receptacle of one unit and then under the corresponding receptacle of the other unit.

10. The apparatus of claim 9 in which said operating means includes a pivotable nozzle and means operated by one of said units to swing said nozzle first under one such receptacle of one unit and then under the corresponding ascending unit of the other unit.

11. The apparatus of claim 9 in which said fluid delivery means includes a pair of nozzles, one for each unit and each positioned below the position of a receptacle of that unit as it starts its ascent, a valve in control of each nozzle, and means to operate each valve whenever a receptacle is so positioned.

12. The apparatus of claim 1 in which each receptacle of each main unit includes an upwardly and outwardly inclined chute extending under the receptacle of the appropriate one of the auxiliary units.

13. The apparatus of claim 1 in which there are a plurality of auxiliary units.

* * * * *